Jan. 23, 1940.   H. ARQUINT ET AL   2,187,768
SAFETY DEVICE FOR GAS CONDUCTORS
Filed Jan. 21, 1935
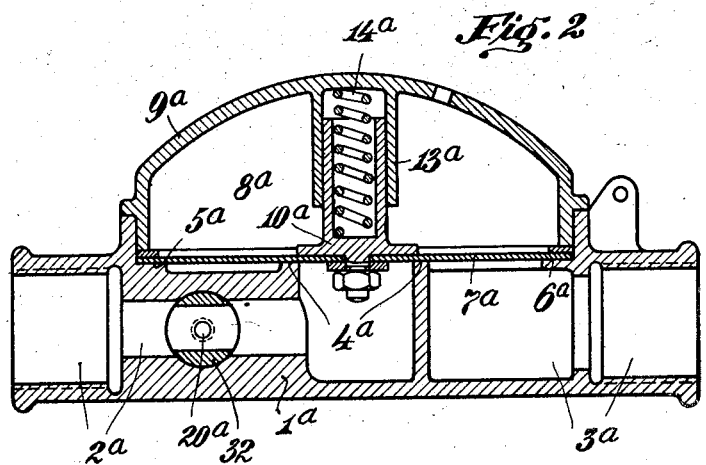
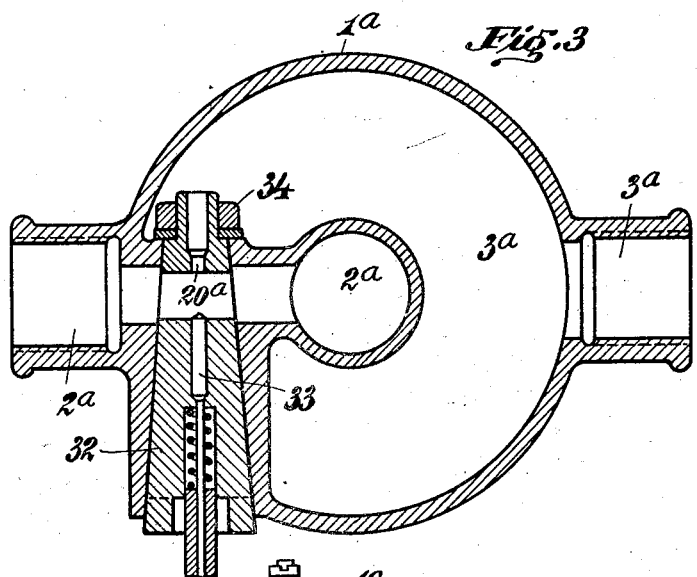
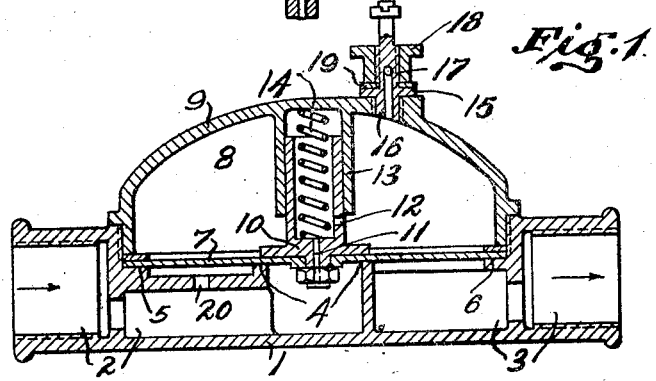
Hans Arquint
Oscar Kiesel
INVENTORS Patented Jan. 23, 1940

2,187,768

UNITED STATES PATENT OFFICE 2,187,768

SAFETY DEVICE FOR GAS CONDUCTORS

Hans Arquint, Sursee, Switzerland, and Oscar Kiesel, Munich, Germany

Application January 21, 1935, Serial No. 2,748
In Germany January 24, 1934

4 Claims. (Cl. 137—153)

The invention relates to valves for automatically cutting off gas supply in case of failure of gas pressure, as for example in case of destruction of domestic supply pipes by fire, causing excessive discharge of gas.

Several forms of apparatus embodying the invention are shown in the accompanying drawing in which:

Fig. 1 is a sectional view of one form of construction,

Figs. 2 and 3 are sections, in planes perpendicular to each other, of another form of construction.

Referring first to the construction shown in Fig. 1, the interior of a casing 1, circular in plan, with two tubular nozzles at opposite parts of its circumference, is divided into two chambers 2, 3, of which the nozzles form parts, the nozzle of the chamber 2 being connected to the gas main and the nozzle of the chamber 3 being connected to the service pipes. The chamber 2, which may be called the supply chamber, is formed by the left hand nozzle and a radial passage leading to a circular compartment at the center of the casing. It is therefore considerably smaller than the chamber 3, which may be called the delivery chamber, and the cross-sectional area for the flow of gas is considerably greater in the chamber 3 than in the chamber 2.

The rim 4 of the wall of the central compartment and a ledge 5, 6 at the rim of the casing 1 form seats for a flexible diaphragm 7 forming the floor of a chamber 8 in a cap 9 screwed to the casing. To the center of the diaphragm 7, above the seat 4, is fixed a tubular spring housing 10, having an opening 11 at the bottom for communication with the chamber 2 and having also an opening 12 in its wall. The spring housing 10 fits slidably into a socket 13 fixed to the cap 9, and contains a helical spring 14 tending to press the diaphragm against the seat 4. The opening 12 is exposed, when the diaphragm is pressed against its seat 4, but is covered by the wall of the socket 13 when the diaphragm and housing 10 are lifted. A screw 15 is screwed into a hole in the cap 9, and has a vent passage 16, 17 for communication between the chamber 8 and the atmosphere, but the outlet of this passage can be closed by means of a nut 18 screwed down on to a washer 19.

In the cover of the radial passage forming part of the chamber 2 there is a small hole 20 affording permanent communication between the chambers 2 and 3.

When the diaphragm 7 is pressed against its seat 4 communication between the supply chamber 2 and the delivery chamber 3 is limited to the small passage 20, so that the normal working supply of gas is cut off from the service pipes.

Under normal working conditions, that is to say with full gas pressure in the main and no excessive discharge from the service pipes, the gas pressure in the chambers 2 and 3 lifts the diaphragm 7, so that communication between the two chambers is maintained for flow of gas to the service pipes. A predetermined minimum of gas pressure must, however, exist in both the chambers in order to hold the diaphragm off its seat 4 against the pressure of the spring 14. Normally, when gas is being consumed, the gas pressure in the delivery chamber 3 will be lower than that in the supply chamber 2, but the lower pressure in the chamber 3 acts on a larger area of diaphragm surface than the higher pressure in the chamber 2. If the pressure in either chamber falls below the critical minimum, the diaphragm drops and cuts off the flow of gas, except in respect of the small orifice 20. If inflow to the chamber 2 continues, gas from this chamber flows through the passage 11, 12 to the chamber 8 and increases the pressure holding the diaphragm against its seat 4. For allowing the diaphragm to rise again under gas pressure the nut 18 must be unscrewed so as to open the vent 16, 17. When this is done the diaphragm will rise if there is normal pressure in the main and no abnormal discharge from the service system, but if there is abnormal discharge the opening of the vent can at most result in temporary lifting of the diaphragm, because the low pressure in the chamber 3 will not support the diaphragm. Hence, normal communication between the chambers 2 and 3 cannot be restored till the conditions of supply and delivery are normal again.

The by-pass orifice 20 enables automatic lifting of the diaphragm to be obtained in restoration of normal conditions without attention to the nut 18, provided that the outlets of the service system are closed. For this purpose the nut 18 is left unscrewed. There is then a continuous light flow of gas through the by-pass 20 to the chamber 3, resulting in an increase of pressure therein which will soon lift the diaphragm sufficiently to close the passage 12 and allow normal flow from the chamber 2 to the chamber 3.

In Figs. 2 and 3 the reference characters designating the like parts as in Fig. 1 are followed by the exponent a. These figures show a modification in which there is a cock 32 traversing the chamber $2^a$ within the valve casting $1^a$, so that inflow of gas can be regulated by turning the cock. The by-pass opening 20ª is in this case an axial passage in the coned plug of the cock, and can be cleaned by thrusting into it a rod 33 mounted in the cock and actuated by a spring loaded handle accessible from outside the casing. The retaining nut 34 of the plug is inside the casing, so that it is not accessible without opening the same, and we may arrange that the nut can only be unscrewed by means of a special key.

It will be understood that the device described may be serviceable in various ways. Each individual consumer provided therewith is safeguarded from accidents or damage due to escape of gas on destruction or partial destruction of his service pipes and the authorities controlling the gas mains are able (for instance in the case of a threatened air attack) to extinguish lights by a temporary reduction of pressure in the mains, without risk of accidents due to open taps when the pressure is restored, because where taps are open the restored pressure will not re-establish connection to the respective service system.

We claim:

1. A gas supply control device to be inserted into a gas main comprising a housing having therein a gas supply chamber, a passage of reduced cross section connecting said supply chamber with the supply part of the main, a gas delivery chamber having a greater cross sectional flow area than said supply chamber, a passage of reduced cross section connecting said delivery chamber with the delivery part of the main, a constricted by-pass establishing permanent communication between said chambers, and a third chamber superimposed on said supply and delivery chambers, a valve interposed between said supply chamber and said delivery chamber said valve comprising a flexible diaphragm forming a gas tight closure for said superimposed chamber and having one face thereof exposed directly to the gas pressure in the supply and delivery chambers and a spring exerting seating pressure on said diaphragm of force sufficient to overcome a predetermined minimum gas pressure on said diaphragm.

2. A gas supply control device, comprising a housing having therein a gas supply chamber, a gas delivery chamber, a constricted by-pass establishing permanent communication between said chambers and a third chamber superimposed on said supply and delivery chambers, a valve interposed between said third chamber and said other two chambers said valve forming a gas tight closure for said superimposed chamber and comprising a flexible diaphragm one face of which is exposed directly to the gas pressure in the supply and delivery chamber, means exerting seating pressure on said diaphragm of force sufficient to overcome a predetermined minimum gas pressure on said diaphragm, means embodying a closable vent leading from said third chamber to atmosphere, there being a passage for flow of gas from said supply chamber to said third chamber and means for automatically closing said passage when said diaphragm is unseated.

3. A gas supply control device to be inserted between a gas supply main and a service pipe, comprising a housing having therein a gas supply chamber, a passage connecting said gas supply chamber to said main, a gas delivery chamber and a third chamber superimposed on said supply and delivery chambers, a cock in said passage to regulate the inflow of gas to said supply chamber, said cock having a constricted by-pass therein leading directly to the delivery chamber for establishing permanent communication between the supply and delivery chambers, a valve interposed between said third chamber and said other two chambers said valve forming a gas tight closure for said superimposed chamber and comprising a flexible diaphragm one face of which is exposed directly to the gas pressure in the supply and delivery chambers and spring exerting seating pressure on said diaphragm of force sufficient to overcome a predetermined minimum gas pressure on said diaphragm.

4. A gas supply control device, comprising the combination with the elements claimed in claim 3 of a slidable rod mounted in the plug and a spring loaded exteriorly accessible handle carrying a pin for cleaning the passage in the plug.

HANS ARQUINT.
OSCAR KIESEL.